US011978281B2

(12) United States Patent
Zotto

(10) Patent No.: US 11,978,281 B2
(45) Date of Patent: May 7, 2024

(54) FACIAL EXPRESSION ALTERATIONS

(71) Applicant: Hewlett-Packard Development Company, L.P., Spring, TX (US)

(72) Inventor: Rafael Dal Zotto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 406 days.

(21) Appl. No.: 17/358,443

(22) Filed: Jun. 25, 2021

(65) Prior Publication Data

US 2022/0414366 A1    Dec. 29, 2022

(51) Int. Cl.
*G06V 40/16*    (2022.01)
*G06T 3/4023*    (2024.01)
*G06V 40/20*    (2022.01)
*H04L 12/18*    (2006.01)

(52) U.S. Cl.
CPC .......... *G06V 40/176* (2022.01); *G06T 3/4023* (2013.01); *G06V 40/168* (2022.01); *G06V 40/20* (2022.01); *H04L 12/1822* (2013.01)

(58) Field of Classification Search
CPC .... G06V 40/176; G06V 40/168; G06V 40/20; G06V 40/174; G06T 3/4023; G06T 11/00; H04L 12/1822; H04L 51/10
See application file for complete search history.

(56) References Cited

U.S. PATENT DOCUMENTS

| | | | |
|---|---|---|---|
| 2008/0068397 A1* | 3/2008 | Carey | G06V 40/16 345/619 |
| 2016/0328875 A1* | 11/2016 | Fang | G06T 13/40 |
| 2017/0286759 A1* | 10/2017 | Yao | G06V 40/164 |
| 2018/0114546 A1* | 4/2018 | Singhal | G06V 20/647 |
| 2019/0138794 A1* | 5/2019 | Huang | G06F 21/32 |

* cited by examiner

*Primary Examiner* — Phuoc Tran
(74) *Attorney, Agent, or Firm* — Quarles & Brady LLP

(57) ABSTRACT

In some examples, the disclosure describes a device, comprising: a processor resource, and a non-transitory memory resource storing machine-readable instructions stored thereon that, when executed, cause the processor resource to: determine an emotion based on a facial expression of a user captured within an image, apply a plurality of alterations to the image to exaggerate the facial expression of the user when the emotion has continued for a threshold quantity of time, and remove the plurality of alterations to the image when the emotion of the user has changed.

20 Claims, 5 Drawing Sheets

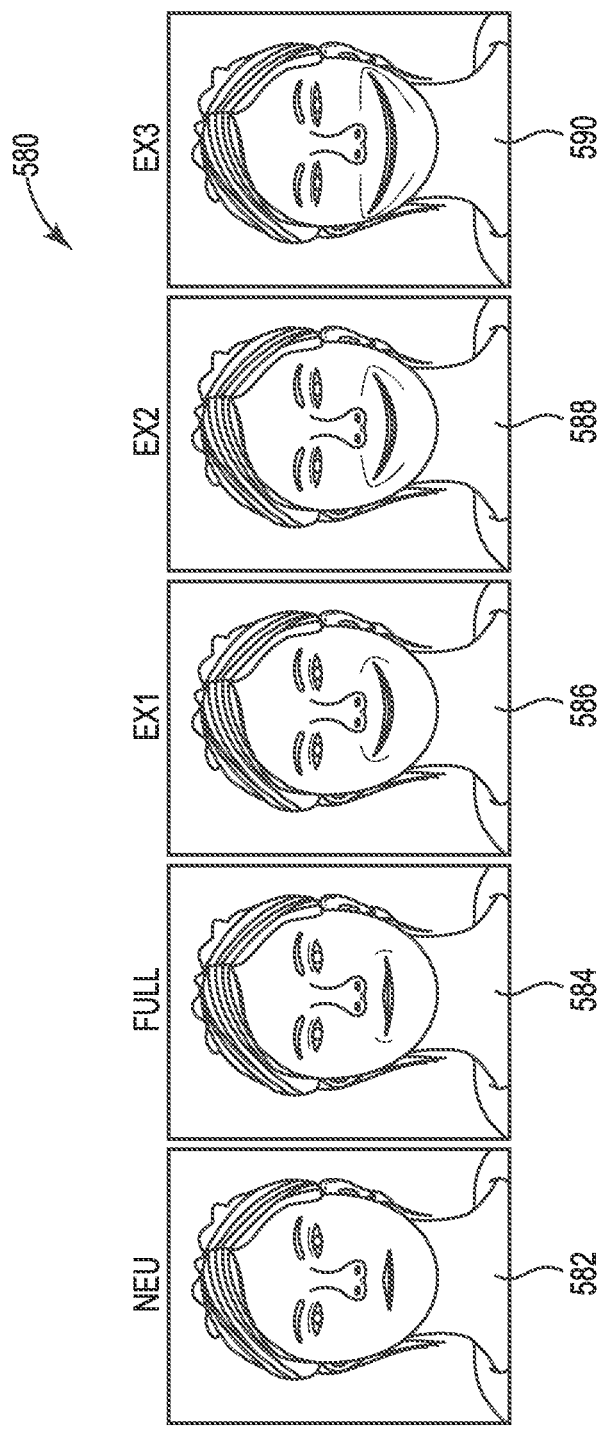

FACIAL EXPRESSION ALTERATIONS

BACKGROUND

An electronic device can include a computing device that can perform computing functions. In some examples, the computing device can be coupled to an imaging device, such as a camera. The camera can be utilized to capture images of objects and the computing device can be utilized to store and/or display the images captured by the imaging device.

BRIEF DESCRIPTION OF THE DRAWINGS

FIG. 5 illustrates an example of exaggeration levels of facial expressions for a particular user.

DETAILED DESCRIPTION

Figure 1:
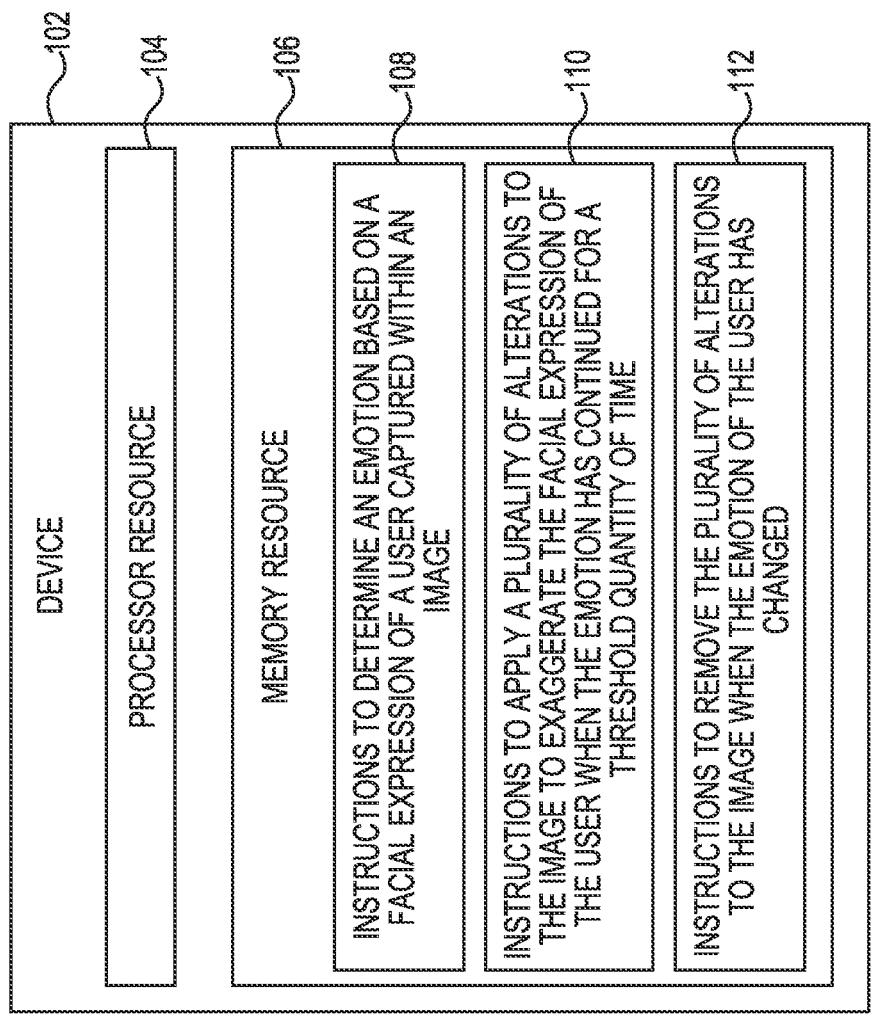
FIG. 1 illustrates an example of a device for providing facial expression alterations.

A user may utilize a computing device for various purposes, such as for business and/or recreational use. As used herein, the term computing device refers to an electronic system having a processor resource and a memory resource. Examples of computing devices can include, for instance, a laptop computer, a notebook computer, a desktop computer, controller, and/or a mobile device (e.g., a smart phone, tablet, personal digital assistant, etc.), among other types of computing devices.

In some examples, computing devices can be utilized as teleconference devices. As used herein, a teleconference device can be utilized to provide audio and/or video data to remote computing devices. In this way, a teleconference device can be a computing device that can communicate with remote computing devices and allow remote users to communicate through audio and/or video data transferred between the plurality of computing devices. In some examples, a plurality of computing devices can be utilized for a teleconference by connecting to a teleconference application. In some examples, the teleconference application can include instructions that can be utilized to receive audio and/or video data from the plurality of computing devices and provide the audio and/or video data to each of the plurality of computing devices. In some examples, the teleconference application can be a teleconference portal that can be utilized by a plurality of computing devices to exchange audio and/or video data. As used herein, a teleconference portal can refer to a gateway for a website that can provide teleconferencing functions.

In some examples, the images captured by an imaging device associated with a teleconference device can include human users. In some examples, the images captured of the human users can be utilized to illustrate facial expressions or other expressions of the human users. However, these facial expressions or other expressions can be more difficult to identify than during a physical interaction between human users. In some examples, the facial expressions can correspond to a particular mood or emotional experience of the human user. In this way, it can be more difficult for a particular user to identify a mood of a plurality of other users during a teleconference session with the plurality of other users.

The present disclosure relates to providing facial expression alterations for captured images to be displayed on the plurality of teleconference devices associated with the teleconference session. In this way, a particular user can more easily identify the emotions being expressed by the plurality of users associated with the teleconference session. In some examples, a controller can intercept images captured by an imaging device (e.g., camera, video camera, etc.). In some examples, the imaging device can utilize a field-programmable gate array (FGPA) machine learning hardware. In these examples, the FGPA machine learning hardware can be customized for a particular architecture (e.g., convolutional neural network, etc.) to perform the functions described herein. The images can be utilized to determine when a particular user is expressing an emotion for a threshold period of time. In these examples, the controller can alter the facial expression to exaggerate the determined emotion of the user and provide the images with the exaggerated emotions to the plurality of users associated with the teleconference session.

FIG. 1 illustrates an example of a device 102 for providing facial expression alterations. In some examples, the device 102 can include a processor resource 104 communicatively coupled to a memory resource 106. As described further herein, the memory resource 106 can include instructions 108, 110, 112, 114 that can be executed by the processor resource 104 to perform particular functions. In some examples, the device 102 can be utilized to interact with a plurality of remote computing devices and/or remote teleconference devices. In some examples, the device 102 can be coupled to a microphone, imaging device (e.g., camera, video camera, etc.), and/or display device (e.g., monitor, etc.). In these examples, the device 102 can capture image data utilizing the imaging device, capture audio data utilizing the microphone, and/or display images captured by remote devices utilizing the display device.

The device 102 can be a computing device that can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112, 114. In other examples, the device 102 can include instructions 108, 110, 112, 114, stored on a machine-readable medium (e.g., memory resource 106, non-transitory computer-readable medium, etc.) and executable by a processor resource 104. In a specific example, the device 102 utilizes a non-transitory computer-readable medium storing instructions 108, 110, 112, 114, that, when executed, cause the processor resource 104 to perform corresponding functions.

In some examples, the device 102 can include instructions 108 to determine an emotion based on a facial expression of a user captured within an image. As described herein, the device 102 can receive images that are captured by an imaging device. For example, the device 102 can receive images from a camera communicatively coupled to a remote computing device (e.g., teleconference device, etc.). In this example, the images can be video images that are captured in real time to provide a real time view of the user within the video image during the teleconference session. In some examples, the video images can include a plurality of frames that are captured by the imaging device and transmitted to the device 102. In some examples, the device 102 can utilize a driver device transform to intercept image data captured by an imaging device associated with a computing device. In some examples, the driver device transform can intercept the image data and alter the image data to include additional elements such the altered or exaggerated expressions. In other examples, a proxy camera or virtual camera can be utilized to intercept the image data and alter the image data to include the additional elements.

In some examples, the device 102 can determine a facial expression of a user within the captured images of the video. The facial expressions can include motions and/or positions of muscles beneath the skin of the face and the corresponding shapes or movements of the face of a human user. In some examples, the facial expressions can be identified based on the corresponding shapes, movements, or other indicators of a human user's face. In some examples, a plurality of points of a user's face can be identified as markers on the face (e.g., markers of the: mouth, nose, eyes, ears, cheeks, etc.). In these examples, the movements or position changes of the plurality of points over a period of time can be utilized to identify particular facial expressions and/or particular facial expression changes. For example, the plurality of points can include areas of a human user's face that can move or be altered for different facial expressions. For example, the plurality of points can include positions at the edges of a user's mouth, the edges of a user's eyes, areas of a user's cheeks, among other areas of a user's face that can change to provide non-verbal communication through facial expressions.

In some examples, the identified facial expressions of a user can be utilized to identify a particular mood or emotion of the human user. In some examples, the facial expressions can correspond to non-verbal communication. As used herein, non-verbal communication can include the transfer of information through the use of body language. For example, non-verbal communication can include facial expressions, hand gestures, and/or body language presented by a user. In some examples, the position or movement of the plurality of points of a user's face can be utilized to determine a particular mood or emotion of the user displayed in the images. In other examples, the user can select a particular mood from a plurality of mood selections. In these examples, the mood is identified by the selected mood.

In some examples, the device 102 can include instructions 110 to apply a plurality of alterations to the image to exaggerate the facial expression of the user when the emotion has continued for a threshold quantity of time. In some examples, the plurality of alterations can distort facial features of the user based on the determined emotion or selected emotion. For example, the alterations can extend or retract a facial feature that is part of expressing the determined emotion. In this way, the facial feature can appear distorted or changed. In some examples, the mood or emotion that is identified by the facial expressions of the user can be tracked to determine when the facial expression or emotion has continued for a particular period of time. In some examples, a threshold quantity of time can be identified for an emotion or a plurality of emotions. In some examples, a particular threshold quantity of time can be selected for each of a plurality of different emotions or a single threshold quantity of time can be selected for the plurality of emotions. For example, a first threshold quantity of time (e.g., 3 seconds) can be selected for a first emotion and a second threshold quantity of time (e.g., 10 seconds) can be selected for a second emotion. In this way, particular emotions can be easier to activate alterations while other emotions can be more difficult to activate the alterations. In some examples, the first emotion can be the same particular emotion as the second emotion. In these examples, the first emotion can be a first emotion level and the second emotion can be a second emotion level for the particular emotion.

In some examples, the device 102 can apply a plurality of alterations to the image to exaggerate the facial expressions of the user. As used herein, the alterations can include distortions or modifications to the image to make the user appear to have altered features. In some examples, the facial features of the user can be modified to heighten or exaggerate the facial expression of the user when the user has maintained the facial expressions or emotion corresponding to the facial expressions for the threshold quantity of time.

In some examples, the alterations can include increasing a size of a particular feature of the facial expressions. In some examples, the pixel size of a portion of the image can be altered (e.g., increased or decreased) to exaggerate a particular facial feature of the user. In one example, the plurality of points that are utilized to identify the facial features and/or emotion of the user can be utilized as points to be altered. For example, a plurality of points surrounding a user's mouth can be utilized to identify when the user is expressing a happy emotion. In this example, the plurality of points surrounding the user's mouth can also be utilized as points of alteration to exaggerate the happy emotion of the user. In this example, the edges of the mouth can be directed in an upward direction to indicate that the user is expressing a happy emotion. When the user is expressing a happy emotion longer than the threshold quantity of time for a happy emotion, the points at the edges of the mouth of the user can be altered to increase the size of the edges of the mouth or extend the edges of the mouth to increase the size of the smile or facial expression. In this way, the image can be altered to exaggerate the happy emotion.

In some examples, the device 102 can include instructions 112 to remove the plurality of alterations to the image when the emotion of the user has changed. In some examples, the device 102 can identify that the facial expression and/or emotion of the user has changed. In these examples, the device 102 can remove the plurality of alterations to the image and provide a non-altered image of the human user to the teleconference application and/or to a plurality of remote computing devices during a teleconference session. As described herein, the image alterations can be utilized to more easily identify non-verbal communication of a plurality of users during a teleconference session. In this way, when the emotion or facial expression of a user changes, the alterations of the image can be changed.

In some examples, the device 102 can continuously monitor the received video images from the imaging device to dynamically alter the images of the user based on the emotions of the user during the teleconference session. In this way, the changing emotions of the user can be exaggerated by altering the facial expressions of the user during the teleconference session. When the emotion or facial expression of the user changes, the alterations of the image can be removed and a time threshold for a different emotion or the same emotion can begin. In some examples, the alterations can be removed and a next emotion can identified to determine when the next emotion has continued for a threshold quantity of time. In this example, the alterations for the next emotion can be implemented into the image until the user stops expressing the next emotion.

In some examples, the alterations implemented on the images of the user can be increased as the quantity of time the user is expressing the emotion continues. For example, the plurality of points surrounding a user's eyes can be altered a first level, first distance, and/or first magnification when the user expresses a particular emotion for a first threshold quantity of time. In this example, the plurality of points surrounding the user's eyes can be altered a second level, second distance, and/or second magnification when the user expresses the particular emotion for a second threshold quantity of time. In this way, the exaggeration of the emotion of the user can be altered based on the quantity of time the user is expressing the particular emotion. For example, the longer the time period that a user is expressing a particular emotion can correspond to a greater alteration or greater exaggeration of the facial features of the user.

Figure 2:
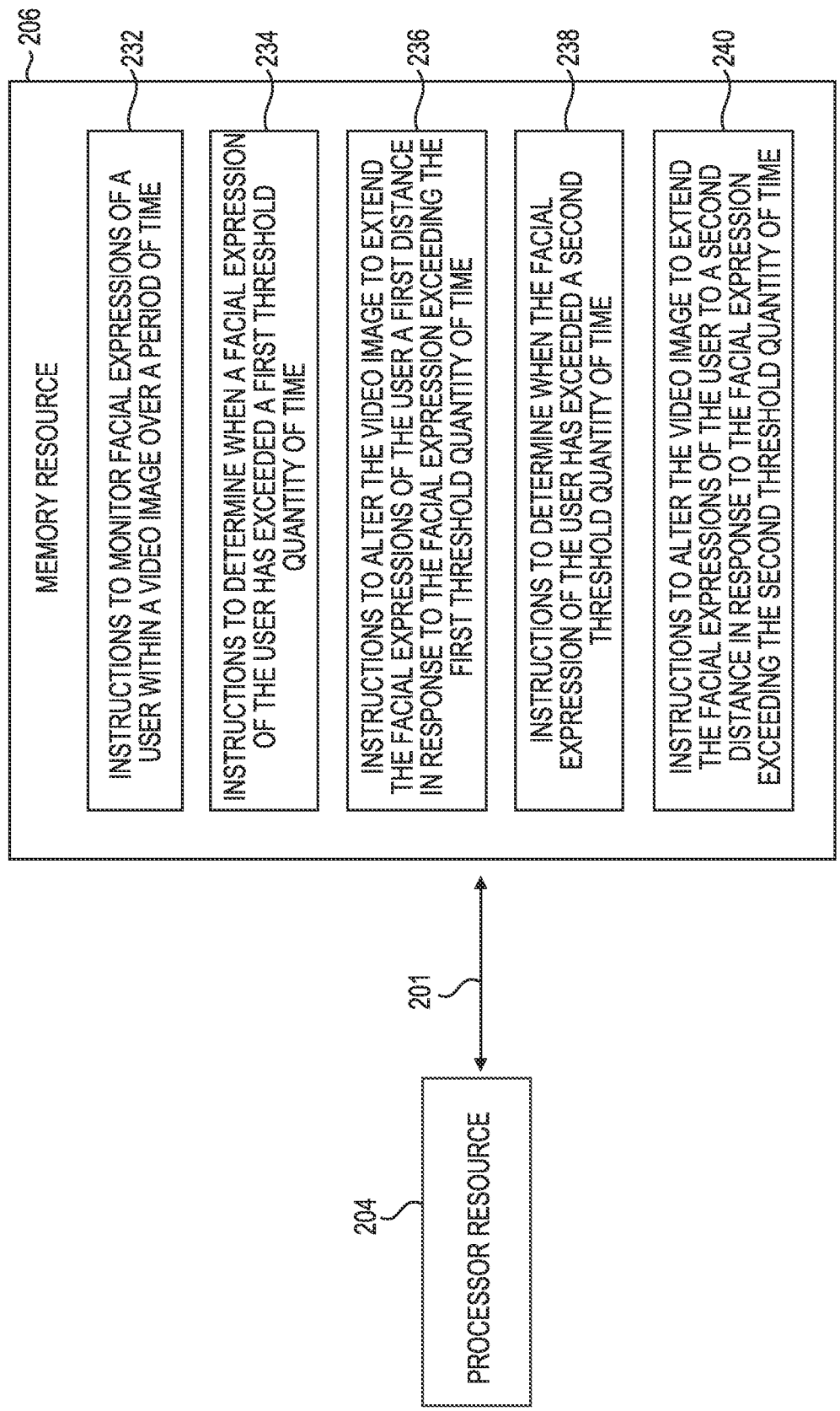
FIG. 2 illustrates an example of a memory resource for providing facial expression alterations.

FIG. 2 illustrates an example of a memory resource 206 for providing facial expression alterations. In some examples, the memory resource 206 can be a part of a computing device or controller that can be communicatively coupled to a system. For example, the memory resource 206 can be part of a device 102 as referenced in FIG. 1. In some examples, the memory resource 206 can be communicatively coupled to a processor resource 204 that can execute instructions 232, 234, 236, 238, 240 stored on the memory resource 206. For example, the memory resource 206 can be communicatively coupled to the processor resource 204 through a communication path 201. In some examples, a communication path 201 can include a wired or wireless connection that can allow communication between devices and/or components within a device or system.

The memory resource 206 may be electronic, magnetic, optical, or other physical storage device that stores executable instructions. Thus, a non-transitory machine-readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 206) may be disposed within a controller and/or computing device. In this example, the executable instructions 232, 234, 236, 238, 240 can be "installed" on the device. In some examples, the non-transitory machine-readable medium (e.g., a memory resource) can be a portable, external or remote storage medium, for example, that allows a computing system to download the instructions 232, 234, 236, 238, 240 from the portable/external/remote storage medium. In this situation, the executable instructions may be part of an "installation package". As described herein, the non-transitory machine-readable medium (e.g., a memory resource 206) can be encoded with executable instructions for performing calculations or computing processes.

The instructions 232, when executed by a processor resource such as the processor resource 204, can include instructions to monitor facial expressions of a user within a video image over a period of time. As described herein, the facial expressions of a user can be monitored during a teleconference session between a plurality of computing devices. In some examples, the video image can be monitored and analyzed based on a plurality of positions of a user's face to monitor the facial expressions of the user. In some examples, the user's face can be identified and a plurality of positions of the user face can be identified and monitored to identify the facial expressions of the user. In some examples, the plurality of positions can include edges or perimeters of different facial features (e.g., mouth, eyes, cheeks, etc.). In this way, the movement and/or locations of the plurality of positions can indicate a corresponding emotion of the user.

The instructions 234, when executed by a processor resource such as the processor resource 204, can include instructions to determine when a facial expression of the user has exceeded a first threshold quantity of time. As described herein, the facial expression of the user can be monitored to determine when the facial expression has continued for a particular duration of time. In some examples, the user can maintain a particular facial expression or particular emotion that corresponds to a range of facial expressions for the first threshold quantity of time. In some examples, the facial expression or particular emotion can be continuous for the first threshold quantity of time. In some examples, the facial expression and/or the particular emotion can change and a timer for the first threshold quantity of time can start over. In this way, the facial expression of the user exceeding the first threshold quantity of time can correspond to a continuous facial expression and/or emotion of the user for a particular quantity of time.

The instructions 236, when executed by a processor resource such as the processor resource 204, can include instructions to alter the video image to extend the facial expressions of the user a first distance in response to the facial expression exceeding the first threshold quantity of time. In some examples, extending the facial expressions of the user can include elongating a portion of the mouth of the user within the image such that the altered image makes the user appear to have a larger mouth area. In some examples, the extended facial expression can be extended from an edge of the mouth, eyes, or cheek area of the face in a direction that is currently expressed by the user. For example, the facial expression of the user can be a frown. In this example, the corners or edges of the mouth portion of the user can be directed in a downward direction. In this example, the corners or edges of the mouth of the user can be extended in the same downward direction to extend the corners of the mouth in the downward direction.

The instructions 238, when executed by a processor resource such as the processor resource 204, can include instructions to determine when the facial expression of the user has exceeded a second threshold quantity of time. In some examples, the user can have the facial expression as a continuous or substantially continuous facial expression from a start time through the first threshold quantity of time and from the first threshold quantity of time to the second threshold quantity of time. In this way, the emotion associated with the facial expression can be determined to be occurring continuously for the second threshold quantity of time. In some examples, the second threshold quantity of time can be a second incremental period of time that can illustrate that the user captured by the video image is expressing the emotion associated with the facial expression for a relatively long period of time.

The instructions 240, when executed by a processor resource such as the processor resource 204, can include instructions to alter the video image to extend the facial expressions of the user to a second distance in response to the facial expression exceeding the second threshold quantity of time. As described herein, the facial expression of the user can be constant or substantially constant from a start time through the second threshold quantity of time. In these examples, the video image can be altered to extend the facial expressions a second distance that is greater than the first distance. In some examples, extending the facial expression the second distance can exaggerate the facial expression and/or emotion of the user to a greater extend than the first distance. In this way, the longer the user expresses the facial expression and/or emotion, the greater the exaggeration of the alteration can be for the image alteration.

Figure 3:
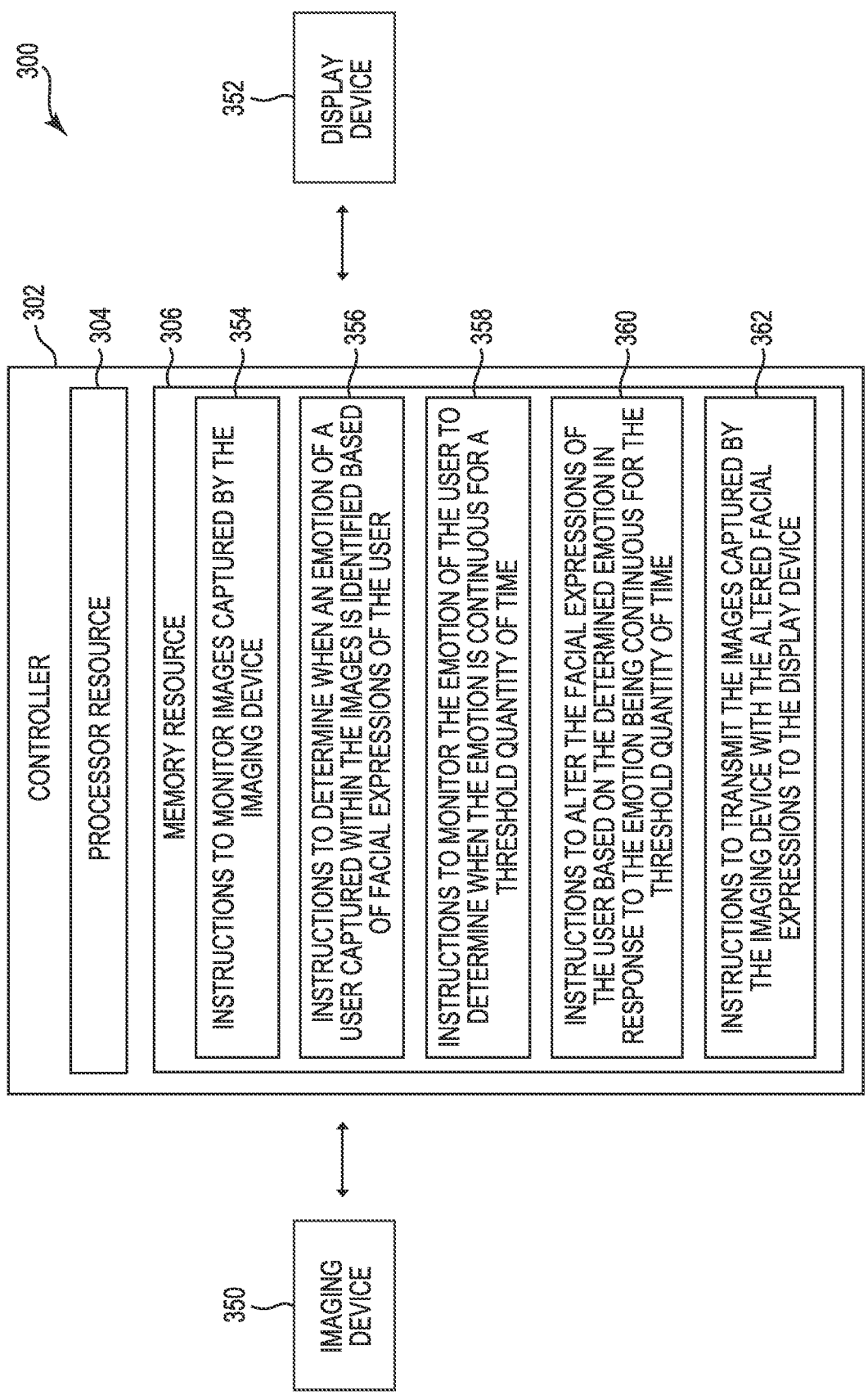
FIG. 3 illustrates an example of a system that includes a controller for providing facial expression alterations.

FIG. 3 illustrates an example of a system 300 that includes a controller 302 for providing facial expression alterations. In some examples, the controller 302 can be a computing device that includes a processor resource 304 communicatively coupled to a memory resource 306. As described herein, the memory resource 306 can include or store instructions 354, 356, 358, 360, 362 that can be executed by the processor resource 304 to perform particular functions.

In some examples, the controller 302 can be associated with a teleconference application and/or teleconference portal. In some examples, the controller 302 can intercept image data to be provided to the teleconference application. In some examples, the controller 302 receive image data from the imaging device 350 associated with a first teleconference device (e.g., first computing device, etc.) and provide the image date and/or video data to the display device 352. In some examples, the display device 352 can be associated with a second teleconference device (e.g., second computing device, etc.). In this way, the controller 302 can be utilized to alter the image data received by the imaging device 350.

In some examples, the display device 352 can be selected based on a user associated with the display device 352. For example, the display device 352 can be one of a plurality of display devices utilized for a teleconference. In this example, the display device 352 can be selected to provide the altered images to while the other display devices utilized for the teleconference receive an original image. In this way, a particular user associated with the display device 352 can view the exaggerated emotions of a user compared to other users associated with the teleconference.

In some examples, the controller 302 can include instructions 354 that can be executed by a processor resource 304 to monitor images captured by the imaging device 350. In some examples, the images captured by the imaging device 350 can include video images that are captured by a video camera associated with a teleconference device. In some examples, monitoring the images captured by the imaging device 350 can include identifying particular points of a user's face and monitoring the movement and/or positions of the particular points of the user's face. In some examples, the particular points can be assigned to particular locations on a user's face captured by the imaging device 350. For example, the particular points can be assigned to edges or corners of a user's mouth, edges or corners of a user's eyes and/or perimeter of other features of a user's face.

In some examples, the controller 302 can include instructions 356 that can be executed by a processor resource 304 to determine when an emotion of a user captured within the images is identified based on facial expressions of the user. As described herein, the particular points of a user's facial features can be identified and monitored to identify when the user is expressing an emotion based on the non-verbal communication expressed by the user's facial expression. In some examples, the facial features of the user can be utilized to determine the emotion of the user. In these examples, a timer can start when the emotion of the user is determined. In some examples, the timer can be utilized to identify when the emotion has exceeded a threshold quantity of time.

In some examples, the controller 302 can include instructions 358 that can be executed by a processor resource 304 to monitor the emotion of the user to determine when the emotion is continuous for a threshold quantity of time. In some examples, the emotion can be continuous or substantially continuous for a particular quantity of time from a start of detecting the emotion. In some examples, the threshold quantity of time can be 2-3 seconds. In these examples, the emotion can exceed the threshold quantity of time when the emotion has been determined to be continuous from a starting time through the quantity of time of the threshold quantity of time. In some examples, the threshold quantity of time can be utilized to identify when an alteration can be made to the image of the user.

In some examples, the controller 302 can include instructions 360 that can be executed by a processor resource 304 to alter the facial expressions of the user based on the determined emotion in response to the emotion being continuous for the threshold quantity of time. As described herein, the facial expression of the user can be altered to exaggerate the determined emotion of the user within the image. In some examples, the altered facial expression can be based on the determined emotion. For example, a happy emotion can correspond to a first type of facial expression alteration and a sad emotion can correspond to a second type of facial expression. In this example, the happy emotion can correspond to altering the edges of the user's mouth in an upward direction to increase a smile of the user, close the eyes of the user, and/or alter a position of the user's cheeks in an upward direction. In this example, the sad emotion can correspond to altering the edges of the user's mouth in a downward direction to increase a frown of the user, alter a shape of the user's eyes in a downward direction, and/or alter a position of the user's cheeks in a downward direction. In other examples, tear drops can be added to the edges of the eyes of the user in response to the sad emotion. The type or extent of the alterations can be based on a quantity of thresholds exceeded with a continuous emotion of the user.

In some examples, the controller 302 can include instructions 362 that can be executed by a processor resource 304 to transmit the images captured by the imaging device 350 with the altered facial expressions to the display device 352. In one examples, the first threshold quantity of time is exceeded when the facial expression is determined for a continuous quantity of time that exceeds the first threshold quantity of time and the second threshold quantity of time is exceeded when the facial expression is determined for a continuous quantity of time that exceeds the first threshold quantity of time and the second threshold quantity of time.

As described herein, the controller 302 can intercept the video images or still images transmitted by the imaging device 350, alter the images, and then transmit the images to the display device 352. In this way, the user of the display device 352 can view the altered images without viewing the original images captured by the imaging device 350.

Figure 4:
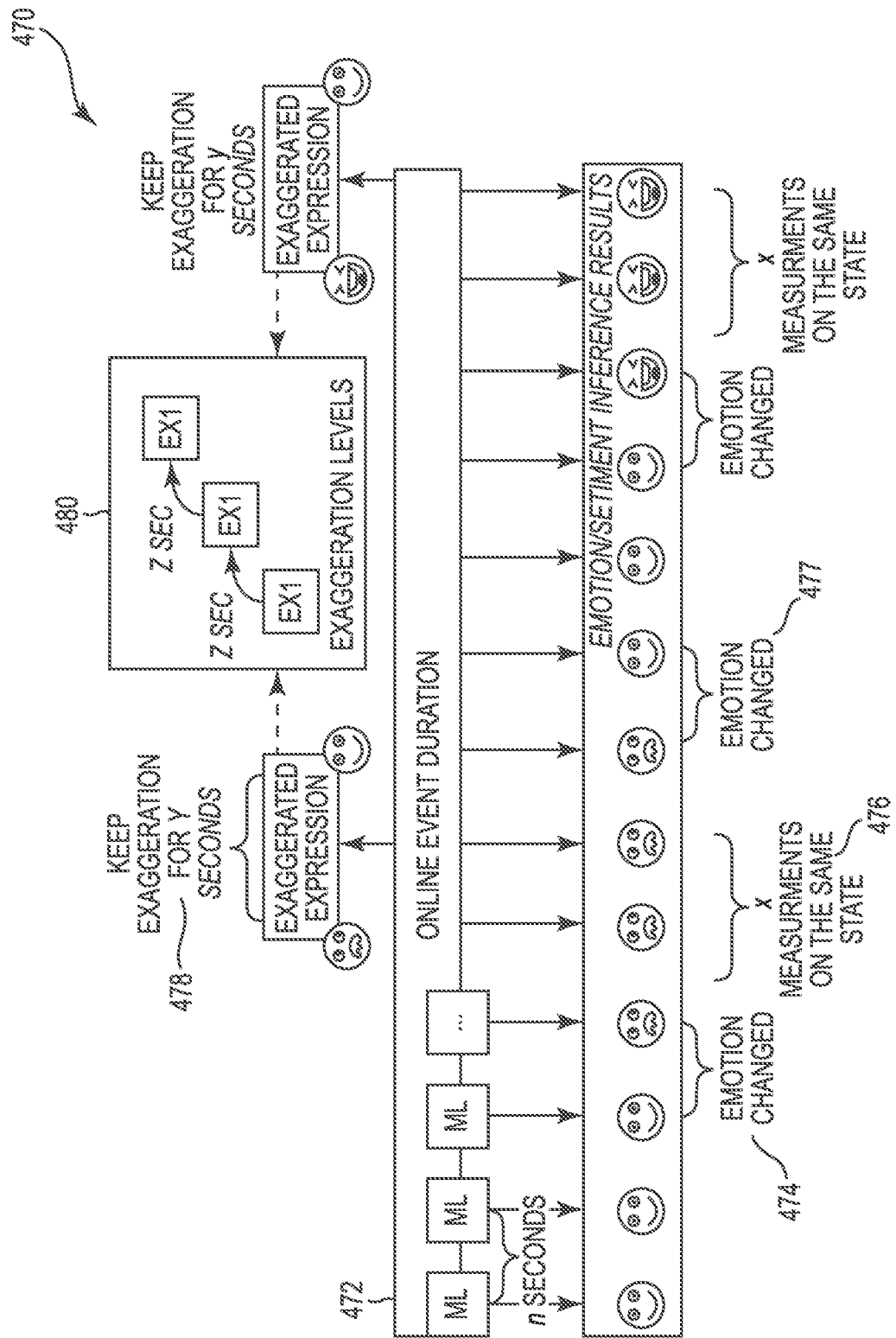
FIG. 4 illustrates an example of a method for providing facial expression alterations.

FIG. 4 illustrates an example of a method 470 for providing facial expression alterations. In some examples, the method 470 can illustrate how instructions that can be executed by a processor resource can provide facial expression alterations as described herein. In some examples, the method 470 can provide facial expression alterations for an online event duration 472. In some examples, the online event duration 472 can include a time duration for a teleconference session between a plurality of computing devices.

In some examples, a controller can be utilized to monitor a facial expression of a user to determine when there is an emotion change 474 by the user. In some examples, the emotion change 474 can be identified based on a position of facial features of the user. As described herein, the position of the facial features can be identified as particular points on the face of the user. As the facial features move to different positions, the emotions of the user can be based on the movement and/or the location of the particular points.

In some examples, the method can determine a measurement on the same state 476. In some examples, the measurements on the same state 476 can be a state of an emotion of the user for a particular time period. As described herein, the emotion being continuous for a threshold period of time the method 470 can alter the facial feature and/or generate an exaggerated expression 478. In some examples, generating the exaggerated expression 478 can be done for a period of time that can end with a further exaggeration or alteration and/or an emotion change.

In some examples, the method 470 can include a plurality of exaggeration levels that can be generated when the emotion of the user has exceeded additional time thresholds. For example, the emotion change 474 can be executed at a starting time T0. In this example, a first level of generated exaggeration 478 of the facial features of the user can be implemented for a time period T1 (e.g., 2 seconds, etc.). In this example, a second level of generated exaggeration 478 of the facial features of the user can be implemented for a time period T2 (e.g., 2 seconds, etc.). In this way, the facial features of the user can be altered to a second level of generated exaggeration 478 when the emotion of the user is continuous or substantially continuous for 4 second from a starting time T0.

In some examples, the method 470 can detect an emotion change 477 and remove the generated exaggeration level from the image and provide an unaltered or original image to the remote computing device. In this way, when the user's emotion changes, the image provided to a remote computing device can be an original image when the user returns to an original emotion. For example, the original emotion of the user can be an emotion prior to the emotion change 474. In a similar way, the facial expressions of the user can be monitored to determine when the emotion of the user remains constant and utilize the exaggeration levels 480 to alter the facial features of the user based on a plurality of time thresholds.

FIG. 5 illustrates an example of exaggeration levels 580 of facial expressions for a particular user. In some examples, the exaggeration levels 580 can correspond to a particular emotion for exaggeration levels 480 in method 470 as referenced in FIG. 4. For example, the exaggeration levels 580 can correspond to a happy emotion of a particular user. As described herein, the facial features of the user can be identified and utilized to determine a corresponding emotion for a user.

In some examples, the facial features of the user at a neutral emotion state 582 can be identified to identify particular facial features and corresponding positions of the facial features. In these examples, the boundary and/or shape of the mouth, eyes, cheeks can be utilized to identify when the user is in the neutral emotion state 582. In some examples, the facial features can be altered to different locations and an emotion can be detected based on the change in locations. For example, the facial features for a full emotion state 584 can be based on an altered position of the cheeks to a higher level, edges or corners of the mouth being altered to a raised or upward direction, and a slightly closing of the eyes. In these examples, the full emotion state 584 can be utilized to identify that the user is expressing a happy emotion.

In some examples, the emotion of happy can be identified based on the full emotion state 584. As described herein, the emotion of happy can be timed to determine when the emotion of happy has exceeded a first time threshold. In some examples, a first level of exaggeration 586 can be utilized to alter the facial features of the user to exaggerate the facial features of the user to exaggerate the happy emotion. In some examples, the emotion of happy can be continuous to a second time threshold and a second level of exaggeration 588 can be utilized to alter the facial features of the user to further exaggerate the facial features of the user beyond the first level of exaggeration 586. Furthermore, the emotion of happy can be continuous to a third time threshold and a third level of exaggeration 590 can be utilized to alter the facial features of the user to further exaggerate the facial features of the user beyond the second level of exaggeration 588. In this way, a controller can alter the facial expression a particular quantity or to a particular level of exaggeration based on a quantity of time associated with the threshold quantity of time.

As described herein, each level of exaggeration can further extend edges of the facial features of the user to further exaggerate the facial features. In this example, the edges of the mouth of the user can be extended along a similar shape or line of the full emotion state 584. Thus, the smile can be a particular shape or angle in the full emotion state 584 and the size of the smile can be the particular shape or angle with an extension in the first level of exaggeration 586. In this way, the full emotion state 584 of the user can be more easily identified by a participant of a teleconference with the user.

In some examples, the plurality of alterations or the level of exaggeration can be based on a selected profile for a particular time period. For example, a first profile can utilize a maximum level of exaggeration as the first level of exaggeration 586 while a second profile can utilize a maximum level of exaggeration as the third level of exaggeration 590. In this way, the level of exaggeration or alteration can be based on a selected profile for the particular teleconference session. In this way, a profile can allow the plurality of alterations to be activated for particular teleconference sessions and deactivated for other teleconference sessions. In some examples, the selected profile can be selected based on the type of teleconference session being utilized. For example, the user can select that the teleconference session is a professional teleconference to initiate a first profile type associated with this type of teleconference or the user can select that the teleconference session is a personal teleconference type to initiate a second profile type.

In other examples, a controller can apply the plurality of alterations or apply a particular level of exaggeration in response to a selection of the emotion from a menu that includes a plurality of emotions. In some examples, the selection can be a manual selection by a user from a list of a plurality of selections. In some examples, the different levels of exaggeration for each of a plurality of emotions can be displayed. For example, the user can select a particular emotion. In this example, the controller can alter the facial expressions of the user based in response to a selection of a particular emotion (e.g., happy, sad, angry, etc.). In this example, a user can view selectable inputs that correspond to the first level of exaggeration 586, the second level of exaggeration 588, and/or the third level of exaggeration. In this way, a user can select the third level of exaggeration 590 and the image of the user can be directly altered to the third level of exaggeration 590 without the controller utilizing the time thresholds or determined mood of the user.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A device, comprising:
  a processor resource; and
  a non-transitory memory resource storing machine-readable instructions stored thereon that, when executed, cause the processor resource to:
    determine an emotion based on a facial expression of a user captured within an image;
    apply a plurality of alterations to the image to exaggerate the facial expression of the user in response to a determination that the emotion has continued for a threshold quantity of time; and
    remove the plurality of alterations to the image when the emotion of the user has changed.

2. The device of claim 1, wherein the plurality of alterations are based on the determined emotion.

3. The device of claim 1, wherein the plurality of alterations distort facial features of the user based on the determined emotion.

4. The device of claim 1, wherein the plurality of alterations extend portions of a mouth of the user in a direction observed within the image.

5. The device of claim 1, wherein the plurality of alterations are based on a selected profile for a particular time period.

6. The device of claim 1, wherein the processor resource is to apply the plurality of alterations in response to a selection of the emotion from a menu that includes a plurality of emotions.

7. The device of claim 1, wherein the processor resource is to transmit the image including the plurality of alterations to a remote computing device.

8. The device of claim 1, wherein the plurality of alterations is a first plurality of alterations, and the threshold quantity of time is a first threshold quantity of time, and
  wherein the non-transitory memory resource stores machine-readable instructions stored thereon that, when executed, cause the processor resource to:
    apply a second plurality of alterations to the image to exaggerate the facial expression of the user in response to a determination that the emotion has continued for a second threshold quantity of time; and
    remove the first plurality of alterations and the second plurality of alterations to the image when the emotion of the user has changed.

9. The device of claim 8, wherein the second threshold quantity of time is greater than the first threshold quantity of time, and
  wherein the second plurality of alterations further extends an edge of a facial feature of the image than the first plurality of alterations.

10. The device of claim 1, wherein the threshold quantity of time is at least two seconds.

11. A non-transitory memory resource storing machine-readable instructions stored thereon that, when executed, cause a processor resource to:
  monitor facial expressions of a user within a video image over a period of time;
  determine when a facial expression of the user has exceeded a first threshold quantity of time;
  alter the video image to extend the facial expressions of the user to a first distance in response to the facial expression exceeding the first threshold quantity of time;
  determine when the facial expression of the user has exceeded a second threshold quantity of time; and
  alter the video image to extend the facial expressions of the user to a second distance in response to the facial expression exceeding the second threshold quantity of time.

12. The memory resource of claim 11, wherein the first threshold quantity of time is exceeded when the facial expression is determined for a continuous quantity of time that exceeds the first threshold quantity of time and the second threshold quantity of time is exceeded when the facial expression is determined for a continuous quantity of time that exceeds the first threshold quantity of time and the second threshold quantity of time.

13. The memory resource of claim 11, wherein the instructions to alter the video image to extend the facial expressions of the user include instructions to extend the facial expressions of the user to exaggerate the facial expressions of the user.

14. The memory resource of claim 11, wherein the processor resource is to alter the image to an original image of the user in response to a determination that the facial expression of the user has changed.

15. The memory resource of claim 11, wherein the second threshold quantity of time is longer than the first threshold quantity of time, and
  wherein the second distance is greater than the first distance to show a greater exaggeration of the facial expression when the facial expression exceeds the second threshold quantity of time than the first threshold quantity of time.

16. A system, comprising:
  an imaging device;
  a display device; and
  a controller comprising instructions to:
    monitor images captured by the imaging device;
    determine when an emotion of a user captured within the images is identified based on facial expressions of the user;
    monitor the emotion of the user to determine when the emotion is continuous for a threshold quantity of time;
    alter the facial expressions of the user based on the determined emotion in response to the emotion being continuous for the threshold quantity of time; and transmit the images captured by the imaging device with the altered facial expressions to the display device.

17. The system of claim 16, wherein the display device is selected based on a user associated with the display device.

18. The system of claim 16, wherein the controller includes instructions to alter the facial expressions of the user based in response to a selection of a particular emotion.

19. The system of claim 16, wherein the controller includes instructions to alter the facial expressions based on a quantity of time associated with a different threshold quantity of time.

20. The system of claim 16, wherein the threshold quantity of time is a first threshold quantity of time, and wherein the controller includes instructions to:
    monitor the emotion of the user to determine when the emotion is continuous for a second threshold quantity of time, the second threshold quantity of time being greater than the first threshold quantity of time; and
    alter the facial expressions of the user to show a greater exaggeration of the facial expression in response to the emotion being continuous for the second threshold quantity of time.

\* \* \* \* \*